Oct. 20, 1953     T. M. KLAVON     2,655,822
WORKHOLDER FOR DRILL PRESSES
Filed June 15, 1948     2 Sheets—Sheet 1
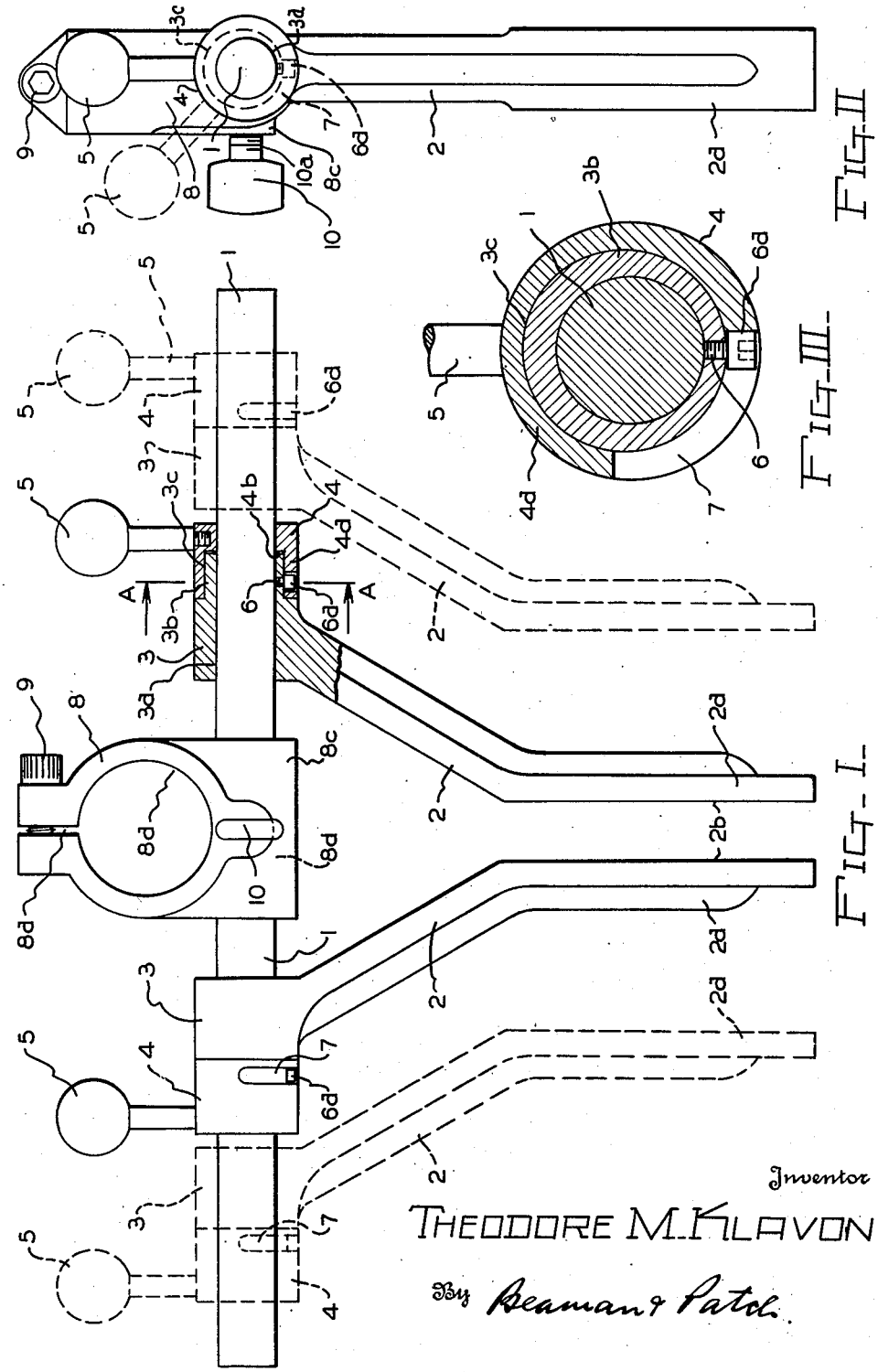
Inventor
THEODORE M. KLAVON
By Beaman & Patch Oct. 20, 1953 T. M. KLAVON 2,655,822
WORKHOLDER FOR DRILL PRESSES
Filed June 15, 1948 2 Sheets-Sheet 2
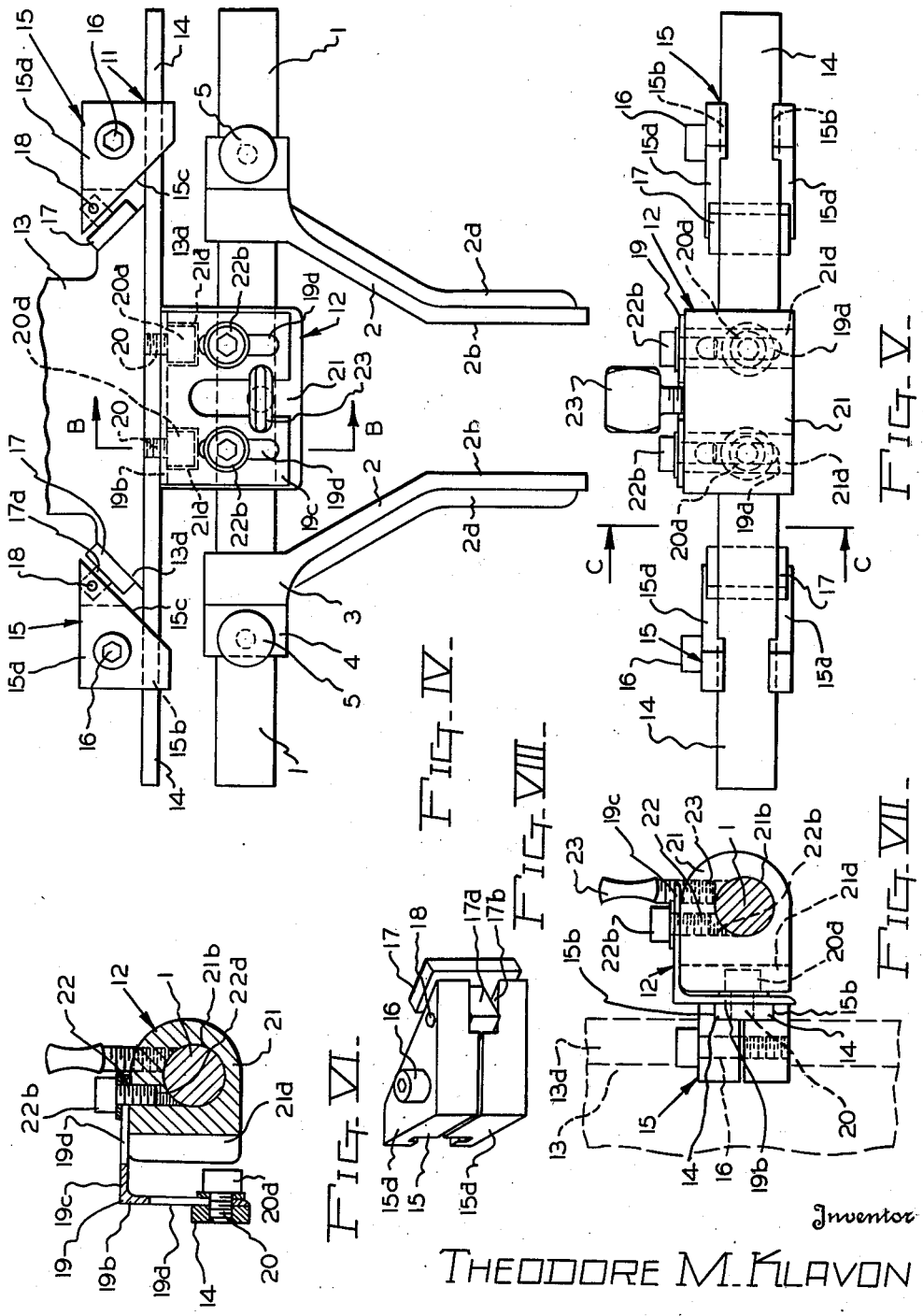
Inventor
THEODORE M. KLAVON
By Beaman & Patch Patented Oct. 20, 1953

2,655,822

UNITED STATES PATENT OFFICE 2,655,822

WORKHOLDER FOR DRILL PRESSES

Theodore M. Klavon, Jackson, Mich., assignor to Universal Vice & Tool Company, Parma, Mich., a partnership Application June 15, 1948, Serial No. 33,087

1 Claim. (Cl. 77—63)

This invention relates to the work holding means employed on drill presses and like machines having a column structure with which the work holding means is required to be operatively associated to permit a workpiece to be held securely positioned on the machine for operation upon by the drill spindle or like machine tool.

It is an object of the invention to provide an improved form of work holding means of the above mentioned character, which can be incorporated in the actual machine but is preferably and advantageously supplied as a separate piece of mechanism for attachment to existing machines.

It is thus an object of the invention to provide a work holder attachment means adapted for mounting upon the column structure of a drill press or like machine to provide for the secure holding of a workpiece for operation upon by the drill spindle or other machine tool, while permitting ready and accurate adjustment of the work engaging means relatively to the drill spindle or the like to be effected.

A particular object of the invention is to provide a work holder attachment means for use in connection with a drill press or the like in which the attachment comprises work engaging jaw members associated with quick-action locking and unlocking means by the operation of which the jaw members are permitted to be rapidly and easily adjusted into position for engaging a workpiece, to hold the latter accurately and firmly secured for operation upon by the drill spindle or the like, while permitting the jaw members to be also capable of being rapidly and easily moved into an inoperative position at will.

It is also an object of the invention to provide a work holder means for use on a drill press or the like wherein the work engaging means is readily adjustable in two directions to permit the same to be accurately positioned for their work engaging function having regard to the different column and work table constructions adopted for the existing and standard type drilling machines, in particular. Thus, where these employ a spindle-like column extending vertically above a horizontal work table, supported upon the column to extend forwardly therefrom, the invention provides a work holder device comprising a clamp engageable with the column and carrying, in forwardly spaced relationship to the latter, a laterally extending horizontal bar upon which there are mounted a pair of jaw members formed to overlie the work table and rest upon the latter, these jaw members being rotatable in a vertical plane with respect to their supporting bar as well and being adjustable longitudinally of the latter. Where, however, the drill press or like machine has a vertical column of rectangular or dovetail section the invention provides a special clamp construction, suited to such column shape, and a separate clamp for supporting the laterally extending horizontal bar carrying the work engaging jaw members, the latter being also rotatably and slidably mounted upon their carrier bar and the clamp therefor being also both vertically and transversely adjustable relatively to the column clamp, whereby the bar can be adjustably located in a set position above the work table and in front of the rectangular or dovetail section column.

The above and other objects and advantages of the invention will appear clear from a consideration of two practical constructions and applications of the invention with reference to the accompanying drawings in which:

Fig. I is an elevational plan view of one embodiment of the invention in the form of a work holder attachment for a drill press or like machine having a spindle-like vertical column, the boss portion of the right hand clamping jaw being shown in section to disclose the quick-action locking and unlocking detail and both jaw members being shown in dotted as well as in full line positions to illustrate the possibility of longitudinal adjustment thereof, Fig. II is an elevational view looking on the right hand end of Fig. I.

Fig. III is an enlarged cross section on the line A—A of Fig. I,

Fig. IV is a plan view of the second embodiment of the invention, adapted for attachment to a dovetail section column, Fig. V is a front end-on view of Fig. IV, with the clamping jaws removed, Fig. VI is a transverse section on the line B—B of Fig. IV, Fig. VII is a transverse section on the line C—C of Fig. V, and Fig. VIII is a perspective view of one of the clamping plates as seen in Fig. IV.

In carrying the invention into effect as illustrated in the drawings a work holder attachment device for the vertically extending column of a drill press or the like is provided which attachment, in both forms of the invention, comprises a cylindrical bar or rod member 1 and a pair of jaw members 2 which are preferably of laterally cranked formation, as shown clearly in Figures I and IV, and have free parallel end portions 2a formed on their opposed surfaces 2b to provide adequate engaging surfaces for a workpiece supported on the drill press table (not shown). The jaw members are of similar construction and each has a boss portion 3, at one end, with a bore 3a by which the jaw member is slidably mounted upon the bar or rod member 1, and a reduced end portion 3b, the bore of which is co-extensive and concentric with the remaining portion of the boss but the reduced outer cylindrical surface 3c of which is eccentric to the bore and hence to the bar or rod 1.

Each jaw member end boss 3, therefore, has an end reduced hollow male portion 3b with which an exact mating female cylindrical recessed portion 4a of a collar member 4 engages and co-operates to form a quick-action eccentric locking device by which the associated jaw member can be quickly released for sliding motion along the bar or rod member 1, or can be quickly and securely locked to the latter in the required axially adjusted position. The collar 4 has a concentric bore portion 4b which is normally (as shown in Figures I and III) co-extensive with the boss bore 2d and is hence concentric with the bar or rod 1 whereas the interior cylindrical surface of the recessed collar portion 4a, except for machining clearance, is of exactly the same eccentricity as that of the exterior cylindrical surface of the male boss portion 3b. It will be appreciated therefore that, by rotary movement of the collar 4 in one direction, relatively to the associated boss 3, the axial collar bore portion 4a can be shifted from its position of concentricity, as shown in Figures I and III, to a position of eccentricity and this due to the rotation of the interiorly eccentric collar portion 4a about the corresponding exteriorly eccentric boss portion 3b. This will give rise to a binding of the collar onto the bar or rod 1 and hence produce a temporary lock which can only be released by turning the collar back in the opposite direction.

The oscillatory motion of the collar 4, to effect the desired locking or unlocking condition, is conveniently effected by a hand lever 5 secured upon the collar to project radially therefrom. A stud 6 secured to the reduced and eccentric boss portion 3b and having its head 6a located within an arcuate slot 7 in the collar 4 serves to hold the boss and collar against axial separation and is so related to the prevailing eccentricity that the collar bore 4a is concentric with the bar or rod 1 when the stud head is at one end of the slot 7.

Each jaw member 2 therefore can be readily adjusted along the bar or rod 1 or be locked thereto by a simple and quick action, as thus described. The locking collars and associated parts would be formed and arranged to correspond to the right and left hand positions of the parts, as seen in Figures I and IV, and preferably the arrangement would be such that the hand levers require to be pushed backwards to effect unlocking and pulled forwards to effect locking.

Turning now to the one embodiment according to Figures I, II and III there is provided, for use in association with the bar or rod 1 and jaws 2, a clamp 8 in the form of a cylindrical collar having an axial split 8a and a bore 8b through which the vertically extending spindle-like column (not shown) of a drill press or like machine can extend with the clamp located above the work table (also not shown, as above stated) and with the possibility of the clamp being adjustable upon the column by loosening the clamp tightening screw 9. The clamp has a front portion 8c containing a laterally extending bore 8d through which the bar or rod 1 is capable of being slid and releasably locked upon the clamp by the actuation of the thumb screw 10, the screwed shank 10a of which engages a screw-threaded vertical bore in the clamp portion 8c so that its inner end can be tightened upon, or freed from, the bar or rod portion beneath and located in the bore 8d.

In use, the clamp 8 is adjusted upon the machine column until the jaws 2 bear lightly upon the work table. In this position the jaws can be easily and rapidly adjusted along the bar or rod 1 to securely hold a workpiece upon the work table between their gripping surfaces 2b and in exact position for the required drilling or other machine operations. Moreover, either or both jaw members can be swung upwardly clear of the work table, since each jaw member is rotatably mounted upon the bar or rod 1 by its boss end 3 and the quick-action unlocking or locking collar 4 permits this to be done.

Referring now to Figures IV, V and VI, the embodiment according thereto has a rod or bar 1 and jaw members 2, with their associated quick-action locking and unlocking collars, precisely as and for the purpose shown and described for the previous embodiment. In the present embodiment, however, there is provided a second and special clamp attachment, indicated generally at 11, (Figure IV) to permit the bar or rod 1 and its carrying clamp, indicated generally at 12, to be mounted upon the vertically extending dovetail section column 13 of a drill press or the like. For this purpose the clamp 11 consists of an elongated flat bar 14 upon which there are mounted a pair of clamping brackets 15 each composed of two separate and similar clamping plates 15a secured together by a transverse screw bolt 16 so as to extend upon opposite sides of the flat bar 14 and having opposed guide slots 15b by which these clamp plates can have sliding engagement with the bar 14 when the associated bolt 16 is loosened, the latter normally securing the clamp plates together for adjustment as a unit along the bar.

Each clamp 15 carries a pressure pad 17 having a central squared shank 17a pivotally mounted upon the cross pin 18 and guided for such pivotal movement within a correspondingly shaped composite slot 17b, (Figure VIII) formed between the opposed plates 15a and with respect to the inside face 15c of the associated clamp 15, this face thereof being inclined to correspond with the angle of the corresponding vertical dovetail edge 13a of the column 13.

It will be seen therefore that this clamp 11 can be readily applied to the dovetail section column 13 and be vertically adjusted thereon as required. The clamp is also adjustable as to the width of the column and as to the actual angle of the dovetail edges 13a thereof, within the limits of the inclined clamp faces 15c.

The clamp 11 also supports, by its bar 14, the inverted L section bracket plate 19 of the clamp 12, which bracket plate is secured in a central position upon the bar by a pair of laterally spaced screw studs 20, the heads 20a of which are accommodated in correspondingly spaced vertically extending channels 21a in a removable block 21, forming part of this clamp assembly, and the shank portions of which studs are guided in a pair of correspondingly spaced vertical slots 19a in the vertical limb 19b of the L plate. The construction and arrangement permits the inverted L bracket plate, with the block 21 removed, to be set in any required vertical position with respect to the bar 14 (and hence to the machine work table beneath) and this within the limits of the vertical slots 19a. This amounts to an initial adjustment made when assembling the clamp structure 12 upon a particular drill press or like machine. The block 21 is then placed in position with its vertical channels 21a opposite the stud heads 20a. This block is itself supported from the horizontal limb 19c of the bracket 19 by means of the screw studs 22 the screw-threaded shanks of which are engaged into screw-threaded bores 22a in the block 21 and are guided in forwardly extending slots 19d in the said limb 19c with their heads 22b located on top of the latter. This construction and arrangement therefore affords the possibility of a separate adjustment of the block 21, while mounted on the bracket 19, towards or away from the machine column 13 within the limits of the slots 19d.

In Figure VI the block 21 is shown at its forward limit of adjustment, whereas in Figure VII it is shown at its rearward limit.

The block 21 has the laterally extending bore 21b, by which the bar or rod 1 is slidably mounted upon this block and hence upon the entire work holder attachment, the bar or rod being locked axially relatively to the block by the thumb screw 23. The slot 24 in the top limit 19c of the inverted L bracket plate permits horizontal adjustment of the block 21 to take place relatively to this thumb screw; as will be understood.

It will be appreciated therefore that this work holder means just described can be readily mounted upon a machine column having a dovetail or equivalent section and that when the one clamping structure 11 has been secured in position upon the column by the lightening of the clamps 15 a relatively fine adjustment of the clamp structure 12 is possible to insure that the clamping jaws are capable of having their required bearing engagement with respect to the machine work table beneath. This relatively fine adjustment is procurable by the permitted vertical adjustment of the clamp bracket 19 and by the permitted horizontal adjustment of the block 21.

Having thus particularly described the invention it is desired to define the scope of the required patent protection as follows:

A work holder attachment for drill presses or the like having a vertical extending column and a horizontal table, comprising a horizontally disposed cylindrical bar, a column clamping structure attached to the central portion of said bar, work holding jaws having outer portions parallel to each other and inner portions diverging from said outer portions to clear said central portion and terminating in boss portions bored to receive the portions of said bar extending in opposite directions from said central portion, said bored bossed portions having a sliding and rotational fit with said bar whereby said jaws may be pivoted upon said bar in parallel vertical planes relative to the table, rod locking structure disposed on said bar at the outer side of each of said bossed portions with respect to said central portion, each said rod locking structure having parts interlocking with parts of the corresponding boss portion to prevent relative axial movement between said structure and said boss portion, including pin and slot structure for permitting independent partial rotation of each said structure on said rod relative to its said boss portion, said rod locking structures each having an actuating member for manipulating said structure to clamp the same at selective positions along said bar to vary the spacing between the parallel portions of said jaws disposed above the table.

THEODORE M. KLAVON.

References Cited in the file of this patent

UNITED STATES PATENTS

| Number | Name | Date |
|---|---|---|
| 629,783 | Fanning | Aug. 1, 1899 |
| 634,324 | Canedy | Oct. 3, 1899 |
| 845,799 | Lindner, Jr., | Mar. 5, 1907 |
| 2,148,156 | Hagopian | Feb. 21, 1939 |
| 2,251,253 | Miller | July 29, 1941 |
| 2,276,819 | Boehmer | Mar. 17, 1942 |
| 2,410,243 | Schultz | Oct. 29, 1946 |
| 2,439,151 | Spinnler | Apr. 6, 1948 |
| 2,480,885 | Sedlock | Sept. 6, 1949 |

FOREIGN PATENTS

| Number | Country | Date |
|---|---|---|
| 559,714 | Great Britain | Mar. 21, 1944 |